US006655339B1

(12) United States Patent
Orr

(10) Patent No.: US 6,655,339 B1
(45) Date of Patent: Dec. 2, 2003

(54) SYSTEM FOR CONTROLLING NOISE AND TEMPERATURE IN A VEHICLE CAB

(75) Inventor: David Charles Orr, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/195,420

(22) Filed: Jul. 16, 2002

(51) Int. Cl.[7] ............................................ F02B 75/06
(52) U.S. Cl. ............................................ 123/192.1
(58) Field of Search ........................... 123/192.1, 179.3; 290/40 C

(56) References Cited

U.S. PATENT DOCUMENTS 4,922,869 A * 5/1990 Kadomukai et al. ..... 123/192.1
5,109,815 A * 5/1992 Maeda et al. ............ 123/192.1
5,185,543 A * 2/1993 Tebbe .......................... 310/51
5,537,967 A * 7/1996 Tashiro et al. ........... 123/192.1
5,568,023 A 10/1996 Grayer et al.
6,050,652 A 4/2000 Kolbe et al.
6,085,723 A 7/2000 Pels et al.
6,138,629 A 10/2000 Masberg et al.
6,148,784 A * 11/2000 Masberg et al. ......... 123/192.1
6,158,541 A 12/2000 Tabata et al.
6,286,473 B1 9/2001 Zaremba
6,355,986 B1 3/2002 Kato et al.

* cited by examiner

*Primary Examiner*—Tony M. Argenbright
*Assistant Examiner*—Katrina B. Harris
(74) *Attorney, Agent, or Firm*—Finnegan, Henderson, Farabow, Garrett & Dunner

(57) ABSTRACT

A system is disclosed for controlling engine vibration, noise, and temperature in a cab of a vehicle including a crankshaft rotated by and extending from an engine. A flywheel generator system is operatively mounted on the engine. The flywheel generator system is configured to actively dampen crankshaft vibrations and to generate electricity. The system also includes a temperature control unit electrically coupled to the flywheel generator system. The temperature control unit is configured to control the temperature in the vehicle cab.

23 Claims, 1 Drawing Sheet

SYSTEM FOR CONTROLLING NOISE AND TEMPERATURE IN A VEHICLE CAB

TECHNICAL FIELD

This invention relates generally to a system for providing electrical power and cab noise and temperature control to the cab of a vehicle, and more particularly, to a system for dampening engine vibrations and powering an electric temperature control unit.

BACKGROUND

Truck drivers spend an inordinate amount of time resting in their cabs, with some studies placing the average at about 1800 hours per year. In order to provide an environment conducive to resting and sleeping, these drivers need heating and/or air-conditioning in their cabs. Typically, the drivers will idle their trucks while resting to provide the needed heat or air-conditioning. Truck manufacturers typically provide low idle settings on trucks at around 550–650 RPM. However, these low idle settings may not provide sufficient power to adequately operate the air-conditioning system, may not provide adequate heating capacity, and may not drive the alternator at sufficient speed to restore power to the battery while operating the air-conditioning or heating units.

Truck engines are designed and built to operate optimally at highway speeds. Accordingly, trucks at low idle vibrate, may cause uneven or undesired noise levels, and may have negative effects on engine life.

In order to provide sufficient power to the air-conditioner or heater, truck drivers often override the low idle setting using a mechanical or electrical override to increase the engine speed to about 900–1100 RPM. Additionally, truck drivers may elevate engine idle speeds to find a vibration sweet spot, where the engine may run with minimal vibration and produce a smooth, consistent sound. One known way of overriding the low idle setting is to set the cruise control at the desired RPM.

One drawback of increasing the engine speed from about 600 RPM to about 900 RPM is that fuel consumption increases from about 0.6 gallons per hour (GPH) to within a range of about 1.0–1.3 GPH. It is estimated that in the United States, one percent of total petroleum consumption is due to truck idling. Moreover, it has been estimated that eleven percent of a class 7/8 truck's total annual fuel is consumed during idling. Federal and state governments, along with industry, are looking for a solution to reduce truck idling fuel consumption and emissions.

One known technique for reducing fuel consumption during a rest period is to provide an engine control system that automatically starts the engine to provide heat or air-conditioning when needed, and stops the engine when an acceptable temperature is reached within the cab. However, the noise and vibration from starting and stopping the engine is disruptive to a driver resting in the cab. Furthermore, the problem of engine vibration and uneven engine noise when the engine is idling is not addressed.

The present invention is directed to overcoming one or more of the disadvantages set forth above.

SUMMARY OF THE INVENTION

In one aspect of the invention, a system is disclosed for controlling engine vibration, noise, and temperature in a cab of a vehicle including a crankshaft rotated by and extending from an engine. The system includes a flywheel generator system operatively mounted on the engine. The flywheel generator system is configured to actively dampen crankshaft vibrations and to generate electricity. The system also includes a temperature control unit electrically coupled to the flywheel generator system. The temperature control unit is configured to control the temperature in the vehicle cab.

In another aspect of the invention, a vehicle including a cab for a vehicle operator is disclosed. The vehicle includes a diesel powered, internal combustion engine and a crankshaft driveably rotated by the engine and extending from the engine. The vehicle also includes an HVAC system configured to control the temperature in the cab of the vehicle, a power converter electrically connected to the HVAC system to provide operating power to the HVAC system, and a generator configured to generate power and supply the power to the power converter. The generator is operatively mounted on the crankshaft and configured to actively dampen vibrations of the crankshaft.

BRIEF DESCRIPTION OF THE DRAWINGS

The foregoing and other features and advantages of the invention will be apparent from the following more particular description of the invention, as illustrated in the accompanying drawing.

DETAILED DESCRIPTION

Figure 1:
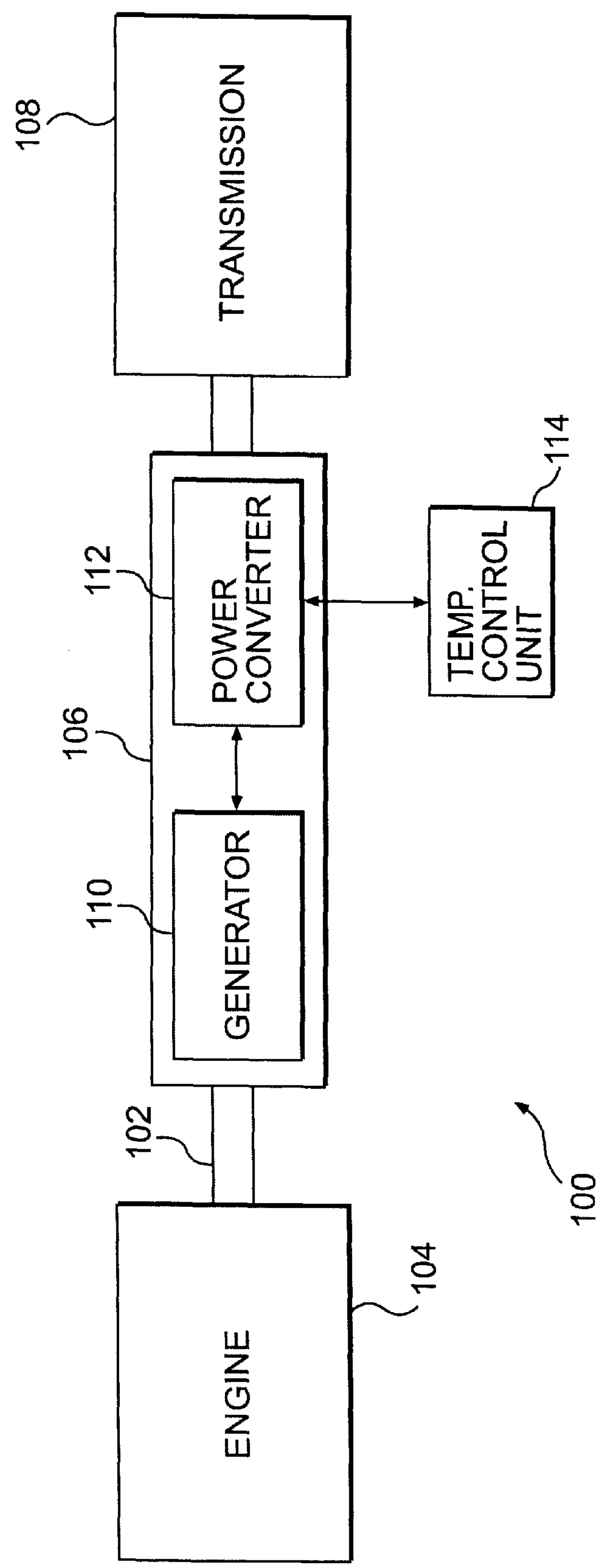
FIG. 1 is a block diagram of an exemplary embodiment of the present invention.

FIG. 1 is a block diagram showing an exemplary system 100 of the present invention. A crankshaft 102 extends from an engine 104, through a flywheel generator system 106, to a transmission 108. Crankshaft 102 is rotatably driven by pistons of engine 104, as is known in the art. Flywheel generator system 106 may be mounted where crankshaft 102 extends from the housing of engine 104. Flywheel generator system 106 (its inertia and dynamic dampening loading) takes the place of a standard flywheel to reduce the uneven and inconsistent loads applied by the pistons. Flywheel generator system 106 includes an active dampening capability and a power generating capability.

Active dampening overcomes torque vibrations by applying a torque with a varying amplitude to the crankshaft to reduce the vibrations and oscillations of the crankshaft, as is known in the art. In one exemplary embodiment, the flywheel generator system may use high speed electronics to determine when to activate electromagnetic devices to apply radial and tangential forces that counteract the vibrations and oscillations of the crankshaft. The flywheel generator system may be electronically controlled and adjusted to offset the vibration and oscillations of the crankshaft at any engine speed, thereby reducing the vibration of the engine. As such, the engine may continue to operate optimally at highway speeds, but also operate more smoothly and efficiently at low engine speeds, such as idling speeds. Accordingly, during idling, noise in the cab is reduced, and the noise is more consistent and smooth. Idling speeds may typically be around 550–650 RPM.

Engine 104 could be any of a variety of known engine types. In one exemplary embodiment, engine 104 is an internal combustion, diesel powered engine configured for a class 5/6 or class 7/8 highway truck. Transmission 108 is driven by crankshaft 102, and provides translation of crankshaft power to the wheels for propelling the vehicle.

Flywheel generator system 106 may include a generator 110 and a power converter 112. Generator 110 may be fixedly mounted onto crankshaft 102 and may rotate with crankshaft 102. The generator 110 may be configured to apply the active dampening described above. In one embodiment, generator 110 serves as both a generator and a starter. When the generator draws energy from the rotating crankshaft, the generator generates power. In contrast, when power is supplied to the generator, the generator facilitates turning of the crankshaft, thereby acting as a starter.

In one exemplary embodiment, generator 110 is an AC induction motor including a rotor mounted directly on crankshaft 102 to rotate with crankshaft 102. In this embodiment, generator 110 also includes a stator fixed within flywheel generator system 106. The stator winding is supplied with electrical current and voltage of adjustable amplitude, phase and frequency by a controller (not shown). In this embodiment, the controller controls the active dampening by receiving input signals from sensors that determine rotational position, instantaneous speed and vibration of the crankshaft 102. The controller signals the generator 110 to provide a varying torque and radial forces of appropriate amplitude in counterphase to the vibrations of crankshaft 102, thereby offsetting and actively dampening the crankshaft.

In another exemplary embodiment, generator 110 is a DC shunt motor/generator. The shunt motor/generator includes brushes and windings on crankshaft 102. Poles are fixed within flywheel generator system 106. By appropriate activation of the poles, the shunt motor/generator may provide torque and radial forces in counterphase to the vibrations of crankshaft 102 to actively dampen the crankshaft.

In another exemplary embodiment, generator 110 is a brushless motor/generator having a DC armature. This brushless DC motor/generator includes permanent magnets fixed to crankshaft 102. DC windings are held stationary within flywheel generator system 106, and are disposed about the magnets. A controller switches the driving flux to the appropriate windings, thereby controlling the torque and radial forces applied to crankshaft 102 to actively dampen the crankshaft.

In another exemplary embodiment, generator 110 is a brushless switch reluctance motor/generator. The brushless switch reluctance motor/generator includes an iron laminate disposed on crankshaft 102. A stator is fixed within the flywheel generator system 106. Electrical current is switched in a sequential pattern to develop a rotating magnetic field, which applies a torque and radial forces to actively dampen crankshaft vibrations.

Generator 110 may generate power from the rotation of the crankshaft, and supply the power to a power converter 112. Power converter 112 could be a high-power, high-speed switching device having capacitance capability or stored energy. Power converter 112 may receive power at intervals or in pulses from generator 110. The pulses may have varying amplitudes and frequencies. Power converter 112 may convert the power to a specific, preset frequency, and continuously output the power at the specific frequency. The specific frequency could be determined by the frequency requirements of the components to be powered by the generator.

Power converter 112 may be electrically connected to a temperature control unit 114. Temperature control unit 114 may control the temperature in a driver's cab, such as in a highway truck or other work vehicle, and is configured to have sufficient heating and/or cooling capacity to effectively heat or cool the cab to a desired comfortable temperature. Temperature control unit 114 could have an intake vent and an outlet vent inside the cab, or may have an intake vent outside the cab.

In one exemplary embodiment, the temperature control unit 114 is an electrical heating, venting, and air-conditioning system (HVAC). The HVAC may be, in one exemplary embodiment, a single, integral, electrical module. In this embodiment, the electrical connection between temperature control unit 114 and power converter 112 may be a single electrical connection cord. Alternatively, in another exemplary embodiment, the HVAC may be separate air-conditioning and heating units, each separately powered by power converter 112. In still another exemplary embodiment, temperature control unit 114 is either an air-conditioning unit or a heating unit.

Generator 110 may be selected to provide sufficient power to operate temperature control unit 114 at maximum capacity at a desired engine speed. For example, in one embodiment, generator 110 is configured to provide sufficient power to operate the temperature control unit 114 at maximum capacity when the crankshaft, from which the power is drawn, rotates at or below a low idle setting. A low idle setting is typically within the range of 550–650 RPM. In another exemplary embodiment, active dampening, together with generator 110, allows the idle speed to be reduced beyond a normal low idling range without having the negative side effects of excessive engine vibration and stalling. Accordingly, generator 110 is selected to operate the temperature control unit at full capacity when the crankshaft rotates at less than the typical 550–650 RPM.

In still another exemplary embodiment, generator 110 may be selected to provide sufficient power to operate temperature control unit 114 at a temperature maintaining capacity. Temperature maintaining capacity is capacity sufficient to maintain a cab temperature with a desired comfortable temperature range after the cab has achieved the comfortable temperature. For example, maintaining a cab temperature within a range of 60–80 degrees Fahrenheit although the temperature outside the cab may vary between typical temperature extremes. In one exemplary embodiment, generator 110 is configured to provide sufficient power to operate the temperature control unit 114 at temperature maintaining capacity when the crankshaft, from which the power is drawn, rotates at or below 650 RPM. In another exemplary embodiment, generator 110 is selected to operate the temperature control unit at temperature maintaining capacity when the crankshaft rotates at less than 550 RPM.

The generator size may be selected based on the power requirement of the temperature control unit to provide full capacity to the temperature control unit even when idling at a low idle for an extended period of time. An extended period of time may be considered any length of time that is longer than the idling that may occur while waiting for traffic light changes, such as when a truck driver idles his truck while sleeping, or waits to have his truck loaded or unloaded.

INDUSTRIAL APPLICABILITY

The present invention enables drivers of trucks, such as, for example, drivers of class 5/6 and class 7/8 highway trucks, to maintain comfortable resting environments in their cabs by lowering engine vibrations and increasing the heating and/or cooling capacity in the cabs. By utilizing the system for active dampening of the engine crankshaft and electrically operating a temperature control unit, such as an HVAC system, with sufficient capacity to heat or cool a cab, operators are no longer required to operate their trucks at high idle speeds to obtain a smooth sound with little vibration and no longer need to increase the idle speed to provide sufficient power to the air-conditioning or heating systems. Therefore, drivers may rest and feel better, and as a result, may be more alert when driving.

Further, the present invention reduces fuel consumption and fuel emissions. Drivers may now maintain comfortable cab environments while idling at low idle settings. Decreasing fuel consumption may dramatically lower fuel expenses for large truck fleets. Furthermore, engine wear may be reduced, thereby extending engine life, and resulting in savings to truck customers. Additionally, running the trucks at low idle may reduce emissions, thereby aiding in maintaining a clean environment.

The disclosed system may be applicable to a wide variety of vehicles and/or machines, including off-highway work machines having industrial engines and cabs, such as, for example, mining, marine, agricultural, and construction equipment.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for controlling engine vibration, noise, and temperature in a cab of a vehicle including a crankshaft rotated by and extending from an engine, the system comprising:

a flywheel generator system operatively mounted on the engine, the flywheel generator system being configured to actively dampen crankshaft vibrations and to generate electricity; and a temperature control unit electrically coupled to the flywheel generator system, the temperature control unit being configured to control the temperature in the vehicle cab.

2. The system of claim 1, wherein the flywheel generator system includes:

a generator mounted on the crankshaft, the generator being configured to actively dampen crankshaft vibrations and to generate power; and a power converter configured to continuously output the generated power to the temperature control unit.

3. The system of claim 2, wherein the generator is one of an induction type generator, shunt type generator, brushless DC motor/generator, and switch reluctance motor/generator.

4. The system of claim 2, wherein the generator is also a starter.

5. The system of claim 2, wherein the generator is configured to apply torque with varying amplitude to the crankshaft to reduce crankshaft vibration.

6. The system of claim 1, wherein the temperature control unit is an HVAC system electrically coupled to and powered by the flywheel generator system.

7. The system of claim 6, wherein the HVAC system is a single module.

8. The system of claim 6, wherein the flywheel generator system is configured to power the HVAC system at a temperature maintaining capacity when the engine is operated at an idle setting below 650 RPM.

9. The system of claim 8, wherein the flywheel generator system is configured to power the HVAC system at a temperature maintaining capacity when the engine is operated at an idle setting below 550 RPM.

10. The system of claim 1, wherein the temperature control unit is one of an air-conditioning system and a heating system.

11. A system for controlling engine noise and temperature in a cab of a vehicle including a crankshaft rotatably connected to and driven by the engine, the system comprising:

a temperature control unit configured to control the temperature in the cab of the vehicle;

a power converter electrically connected to the temperature control unit to provide operating power to the temperature control unit; and a generator configured to generate power and supply the power to the power converter, the generator being operatively mounted on the crankshaft and configured to actively dampen vibrations of the crankshaft.

12. The system of claim 11, wherein the generator is configured to apply torque with varying amplitude to the crankshaft to reduce crankshaft vibration.

13. The system of claim 11, wherein the temperature control unit is an HVAC system.

14. The system of claim 13, wherein the HVAC system is a single module.

15. The system of claim 11, wherein the generator is one of an induction type generator, shunt type generator, brushless DC motor/generator, and switch reluctance motor/generator.

16. The system of claim 15, wherein the generator is also a starter.

17. The system of claim 11, wherein the temperature control unit is one of an air-conditioning system and a heating system.

18. The system of claim 11, wherein the generator generates sufficient power to operate the temperature control unit at a temperature maintaining capacity at an engine idle setting of less than 650 RPM.

19. A vehicle including a cab for a vehicle operator, the vehicle comprising:

a diesel powered, internal combustion engine;

a crankshaft driveably rotated by the engine and extending from the engine;

an HVAC system configured to control the temperature in the cab of the vehicle;

a power converter electrically connected to the HVAC system to provide operating power to the HVAC system; and a generator configured to generate power and supply the power to the power converter, the generator being operatively mounted on the crankshaft and configured to actively dampen vibrations of the crankshaft.

20. The vehicle of claim 19, wherein the generator is configured to apply torque with varying amplitude to the crankshaft to reduce crankshaft vibration.

21. The vehicle of claim 19, wherein the vehicle is an on-highway truck.

22. The vehicle of claim 19, wherein the generator generates sufficient power to power the HVAC system at a temperature maintaining capacity at an engine idle setting of less than 650 RPM.

23. The vehicle of claim 19, wherein the HVAC system is a single module.

* * * * *